United States Patent
Liston

[15] 3,689,012
[45] Sept. 5, 1972

[54] AERIAL CAMERA HOUSING FOR HIGH WING AIRCRAFT

[72] Inventor: Balmer Scott Liston, Painesville, Ohio

[73] Assignee: Diamond Shamrock Corporation, Cleveland, Ohio

[22] Filed: March 3, 1971

[21] Appl. No.: 120,611

[52] U.S. Cl. ............................................... 244/118
[51] Int. Cl. .............................................. B64d 11/00
[58] Field of Search ....................... 244/118; 95/12.5

[56] References Cited

UNITED STATES PATENTS

| | | | |
|---|---|---|---|
| 1,626,787 | 5/1927 | Corlett | 95/12.5 |
| 3,485,151 | 12/1969 | Taylor | 95/12.5 |

*Primary Examiner*—Trygve M. Blix
*Attorney*—Roy Davis, William A. Skinner and Theodore J. Dettling

[57] ABSTRACT

An aerial camera housing for mounting on the wing-strut of a high-wing aircraft has an aerodynamically shaped outer casing having one end open and is attached to an inner and outer bracket to permit mounting to the wing-strut. The outer bracket is attached to the housing by an adjustable suspension assembly for the purpose of providing proper camera alignment with the axis of the plane's flight. The camera is held in a similarly shaped inner casing having an outer diameter slightly less than the inner diameter of the outer casing so as to permit the inner casing to be slidably inserted into the outer casing to form the assembled aerial camera housing.

7 Claims, 4 Drawing Figures

PATENTED SEP 5 1972  3,689,012

INVENTOR
BALMER SCOTT LISTON

BY  Theodore J. Dettling
ATTORNEY

AERIAL CAMERA HOUSING FOR HIGH WING AIRCRAFT

BACKGROUND OF THE INVENTION

This invention is directed to an aerial camera housing adapted to be used with any high-wing aircraft having a wing-strut. More particularly it is directed to a camera housing that can be quickly mounted and dismounted on such aircraft with a minimum of effort and time without requiring any structural modification of the aircraft.

The art and science of aerial photography for purposes of reconnaissance and geographical surveys is an old and well-known art. Normally, aerial cameras that have been used have been mounted in the body of the airplane necessitating structural modifications of the plane to accommodate the camera and to properly position it for the fields of view that are to be photographed. Further it is usually necessary to insulate fuselage-mounted cameras from the vibrations inherent in aircraft, especially those having the engine built into the aircraft fuselage such as the high-wing, light-weight monoplane that comprise the majority of privately owned aircraft.

While it would be highly desirable to be able to utilize such high-wing light aircraft for aerial photography purposes because of their low flight speed and maneuverability and further considering their ready availability, ubiquitousness, and low cost, it is not presently possible to do so, insofar as applicant knows, without permanently modifying the aircraft to accommodate an aerial camera. Such permanent modification, is undesirable or even impractical for at least the following reasons. It increases aircraft cost. It adds weight and makes more complex aircraft design and manufacture. When mounted in the fuselage, it can impinge on available passenger or cargo space and further require the provision of means to insulate the camera from motor-propeller vibrations. Further the present necessity for aircraft modification and/or rebuilding severely reduces the number of high-wing light aircraft available for aerial photography purposes, and hence it is not normally possible to rent a plane adapted for aerial photography.

Bearing in mind this present state of the art and the deficiencies thereof, it is a principal objective of this invention to provide a simple camera housing that can be quickly and easily mounted on aircraft without the necessity of structurally modifying or re-building the aircraft.

More particularly it is an object of this invention to provide a portable camera housing that can be readily mounted on the wing-strut of any high-wing airplane and is easily adjusted so as to align the camera carried in the housing in the desired picture image plane as compared to the direction of aircraft flight, thus allowing its universal use on any such aircraft that may be available.

It is a further object to provide a camera housing having these characteristics that is aerodynamically neutral and light in weight so that when being carried on light aircraft in flight it contributes negligible stress to the wing structure but yet possesses sufficient rigidity and durability to withstand the stresses encountered without distortion or destruction and provide protection from the elements for the camera carried in the housing.

A still further objective is the provision of a camera housing of the above description, that permits ready access to the camera when the housing is mounted on the aircraft.

SUMMARY OF THE INVENTION

These and other objects and advantages, which will be apparent from the following description, are provided by an aerial camera housing that includes in its simplest embodiment an elongated outer casing having a cross-section perpendicular to its length that has a periphery that is essentially convex and exhibits neutral aerodynamic characteristics such as a circle or oval. One end of the casing is capped with an integral convex cover having low aerodynamic friction characteristic such as a semi-sphere while the opposite end is open. An optical-grade sight glass is centrally positioned on the bottom side of the casing.

The outer casing is mounted to the wing-strut of a high-wing airplane by inner and outer suspension assemblies that are centrally attached to each side of the casing and have concave brackets carrying holding straps for embracing the strut. The outer suspension assembly is adjustable so as to permit parallel axial alignment of the camera housing with the axis of the plane's flight.

Slidably mounted inside the outer casing is a contiguous elongated inner casing having the same general peripheral configuration except for a cut-out on its top side to provide camera access and an aperture on its bottom side in axial alignment with the outer-casing sight glass. The inner casing is capped at one end with a convex cover having low aerodynamic friction characteristic such as a hemisphere or cone and has an inner cross brace to support the camera in axial alignment with the aperture.

DESCRIPTION OF THE PREFERRED EMBODIMENT

Figure 4:
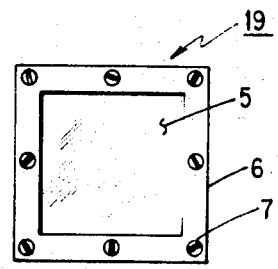
FIG. 4 is a detailed view of the sight glass and frame assembly of the camera housing.

With reference to the drawings illustrating a representative embodiment of the present invention, there is depicted an outer cylindrical casing 1 that has an opening 2 at one end an integral semi-spherical cap 3 at the other end. Both the casing 1 and the cape 3 are made with a fiberglass-reinforced polyester. Centrally located on the bottom side is a sight glass assembly 19 shown in more detail in FIG. 4 consisting of an integral inner frame 4 in which is set a flat pane of optical grade glass 5 that is retained by an outer frame 6 and screws 7.

Figure 1:
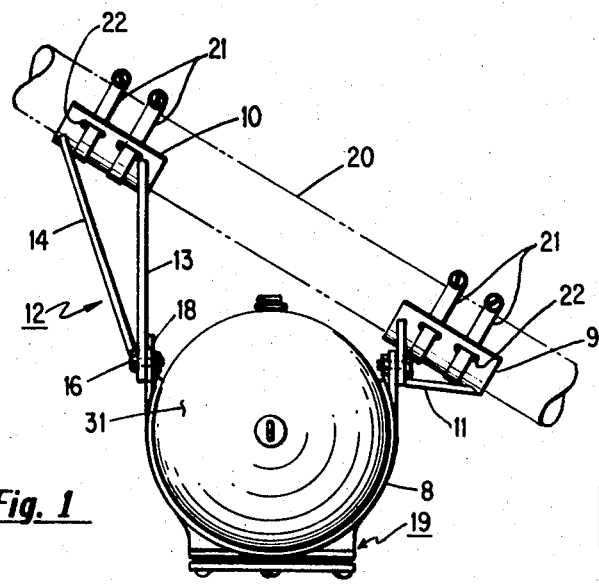
FIG. 1 is a front elevational view of a camera housing of the present invention.
Figure 2:
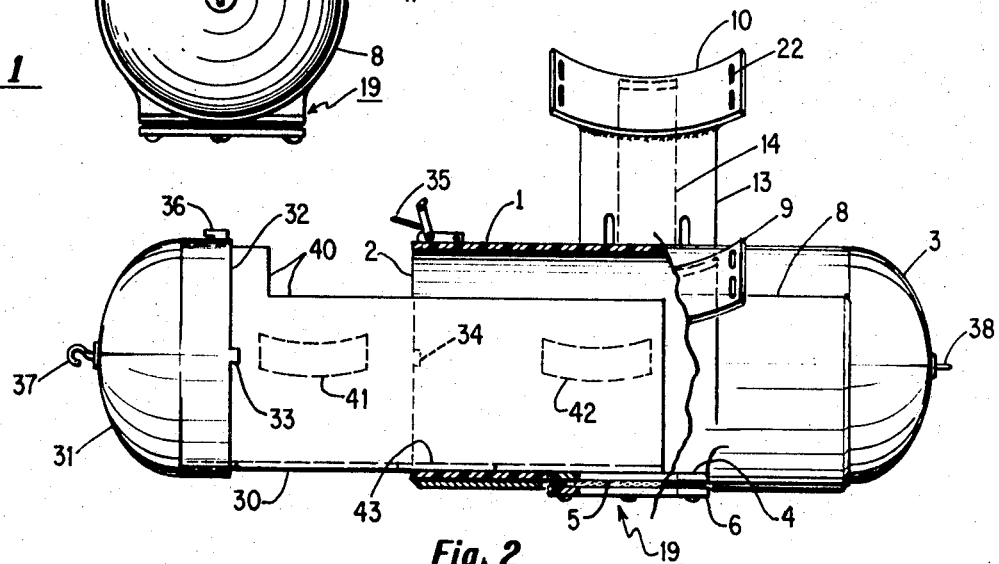
FIG. 2 is a side elevational view partly cut away and in cross-section of the camera housing of FIG. 1.
Figure 3:
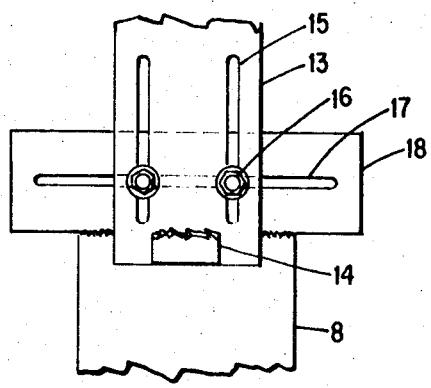
FIG. 3 is a detailed view of the adjustable suspension assembly shown in FIG. 1 that is used to mount the camera housing to the wing-strut.

The outer casing 1 is carried by a thin metal cradle 8 to which is attached an inner wing-strut bracket 9 and an outer wing-strut bracket 10 through an inner suspension assembly 11 and an adjustable outer suspension assembly 12 shown in detail in FIG. 3, that consists of an inner suspension strut 13 and an outer suspension strut 14. The inner suspension strut 13 has vertically extending slots 15 through which bolts 16 extend into a horizontal slot 17 formed in a plate 18 attached to the cradle 8, thus permitting adjustment of the outer bracket 10 in both a horizontal and a vertical direction in relationship to the outer casing 1. When even more latitude in adjusting the camera housing is desired, the inner suspension assembly 11 can have a structure similar to the outer suspension assembly 12 illustrated in FIG. 3. The inner bracket 9 and the outer bracket 10 are mounted to a wing-strut 20 of a highwing monoplane by holding straps 21 passing through slots 22 of the brackets 9 and 10.

Slidably inserted into the outer casing 1 and contiguous therewith is an inner cylindrical casing 30 having an integral semi-spherical cap 31. Both the inner casing 30 and the cap 31 are made with a fiberglass-reinforced polyester. The exterior diameter of the cap 31 at its junction with the inner casing 30 is greater than the exterior diameter of the inner casing 30 so as to form an annular recess 32. The exterior diameter of the cap 31 equals the exterior diameter of the outer casing 1 so that when the inner casing 30 is slid completely into the outer casing 1 a flush junction is formed between them. To prevent rotation of the inner casing 30, a lug 33 appended to the cap 31 is provided that fits tightly into an indent 34 formed in the open end 2 of the outer casing 1. The inner casing 30 and the outer casing 1 are held together in the closed assembled position by catch latch 35 and catch 36. Further secondary holding means are provided by a holding hook 37 centrally attached to the cap 31 and a holding pin 38 centrally attached to the cap 3. When in the closed assembled position an elastic band (not shown) is stretched between hook 37 and pin 38 to prevent accidental separation of inner casing 30 and outer casing 1, if the latching means 35, 36 fails.

An aperture 43 is provided on the bottom side of the inner casing 30 so positioned that it is in axial alignment with the sight glass assembly 19 of the outer casing 1 when the two are in the assembled configuration. Part of the top side of the inner casing 30 is cut away to provide a camera-access opening 40 for inserting the camera (not shown) into the inner casing 30. The camera is held by integral transverse braces 41 and 42 positioned within the inner casing 30 so that the lens of the camera faces and is in axial alignment with the aperture 43.

While the preceding description of a representative embodiment of the aerial housing of this invention has been described with reference to inner and outer casings made with a fiberglass-reinforced polyester, it is manifest that an equally satisfactory aerial housing could be made from other lightweight, rigid plastic materials such as a high-modulus thermoplastic or other thermosets preferably reinforced with a fibrous material or from a lightweight metal such as aluminum or magnesium.

While the aerial housing, which has been illustrated, utilized a cradle to carry and lend additional rigidity to the outer casing 1, it could be eliminated, if desired, by increasing the thickness of the outer casing 1 and mounting the support assemblies 11 and 12 directly thereto as by welding or brazing if metal or by adhesive bonding or mechanical fastening.

When it is desired to use the aerial camera housing of this invention on a high-wing monoplane brackets 9 and 10 are secured to the wing-strut 20 by the holding straps 21. The bolts 16 are loosened and the camera housing vertically and horizontally adjusted to align the longitudinal axis of the camera housing parallel with the axis of the airplane's mode of flight. The bolts 16 are then retightened to hold the camera housing in this position.

The camera housing is mounted on the aircraft so that the cap 31 faces in the direction of flight. During flight, the air pressure generated on the cap 31 forces and holds the annular recess 32 tightly against the mating edge of the outer casing 1 thereby minimizing the chance of air or rain entering the interior of the camera housing and damaging the camera. While this configuration is normally sufficiently air-and water-tight to prevent stray inclusions of water and air, a gasket can be used, if desired, in the recess 32 to ensure a more perfect seal between the cap 31 and the outer casing 1.

Once the camera housing has been mounted on the aircraft, latching means 35, 36 is disengaged and the inner casing 30 slid out of outer casing 1. The camera (not shown), which can be, for example, a 35 millimeter or 70 millimeter roll-film camera having self-contained power means for advancing the film and cocking the shutter, is then placed on the camera mounting braces 41 and 42 so that the lens of the camera is facing and in axial alignment with the aperture 43 of the inner casing 30 and is secured to the braces 41 and 42 by one or more elastic straps (not shown). The inner casing 30 is slid into the outer casing 1 in such a manner that the antirotation lug 33 is inserted into the indent 34 and the snap-latch 35, 36 closed. To ensure against failure of the snap-latch 35, 36 an elastic strap (not shown) can be stretched between the hook 37 and the pin 38 to prevent any accidental disassembly of the inner casing 30 from the outer casing 1, especially during aircraft take-off or landing when little air pressure is exerted against the cap 31.

In flight the camera shutter is activated by a control cable (not shown) that is attached to the camera and passes through the camera housing down the wing strut to the photographer's position in the plane.

From the above description it can be seen, that the camera housing of this invention can be quickly and easily mounted on any high-wing monoplane irrespective of the angle of its wing strut without the need for aircraft modification or rebuilding. As a consequence, it can be universally used on high-wing aircraft wherever available, thus allowing the aerial photographer to rent an airplane in the vicinity of the terrestrial area that is to photographed.

Further because of the unique structural feature of an inner casing and an outer casing employed in the camera housing of this invention, the camera can be readily inserted into or removed from the camera housing without the necessity of first dismounting the camera housing from the airplane. Further this structural configuration confers maximum rigidity and strength to the camera housing with a minimum of weight and further ensures maximum protection to the enclosed camera from air and water damage.

While a representative embodiment of the invention has been described, in the light of these teachings, other modifications and variations of this invention as defined by the following claims will be readily apparent and are meant to be covered thereby:

I claim:

1. An aerial housing for enclosing a camera that can be mounted on a wing strut of a high-wing monoplane which comprises:

an elongated outer casing having a cross-section perpendicular to its length that has a periphery that is essentially ellipsoidal, an opening at one end, and an integral convex cap enclosing the other end;

a sight glass assembly integrally attached to the bottom side of the outer casing;

an elongated inner casing having essentially the same peripheral shape as the outer casing but being sufficiently less in circumference as to allow the inner casing to be slidably inserted into the open end of the outer casing to give an assembled housing in which a major part of the exterior face of the inner casing is contiguous with the interior face of the outer casing;

a convex cap integrally attached to an end of the inner casing having essentially the same exterior shape and circumference at its junction with the inner casing as the open end of the outer casing thereby forming a recess into which the open end of the outer casing fits to give a flush exterior junction in the assembled housing;

the inner casing further having an aperture on its bottom side in axial alignment with the sight glass assembly when the inner casing is inserted into the outer casing to give the assembled housing, and an opening in its top side to permit placement of the camera therein;

means for holding the camera in the inner casing in a position such that its lens is facing and in axial alignment with the aperture, and its picture image plane is essentially parallel with the longitudinal axis of the assembled housing;

means for holding the inner casing and the outer casing together in the assembled housing configuration;

means for adjustably mounting the outer casing to the wing strut of the monoplane to allow the longitudinal axis of the assembled housing to be aligned parallel with the axis of flight of the monoplane.

2. The aerial camera housing of claim 1 further characterized in that the outer casing and inner casing have a cross section that is circular and further comprises means to prevent rotation of the inner casing within the outer casing.

3. The aerial camera housing of claim 1 further characterized in that the outer casing and inner casing have a cross section that is oval.

4. The aerial camera housing of claim 1 in which the means for holding the camera comprises an integral transverse brace bridging the inner casing.

5. The aerial camera housing of claim 1 in which the means for holding the inner casing and the outer casing together comprises a snap latch and a snap catch.

6. The aerial camera housing of claim 1 in which the means for mounting the outer casing to the wing strut comprises:

an inner bracket and an outer bracket capable of carrying holding straps for embracing the wing strut;

an inner suspension assembly joining the inner bracket to the inner side of the outer casing; and, an adjustable outer suspension assembly joining the outer bracket to the outer side of the outer casing and adapted to move the outer bracket in both a horizontal and vertical direction in relationship to the outer casing.

7. The aerial camera housing of claim 6 in which the adjustable outer suspension assembly comprises:

a plate having a horizontal slot attached to the outer casing;

an inner strut attached to the inner side of the bracket, having a vertical slot through which a bolt extends into the horizontal slot of the plate to adjustably attach the inner strut to the plate;

an outer strut having one end attached to the outer side of the bracket and the other end attached to an area of the inner strut displaced from its point of attachment to the bracket.

* * * * *